United States Patent

[11] 3,630,414

| [72] | Inventor | Paul Victor Parmentier<br>Grivegnee, Belgium |
|---|---|---|
| [21] | Appl. No. | 838,246 |
| [22] | Filed | July 1, 1969 |
| [45] | Patented | Dec. 28, 1971 |
| [73] | Assignee | Centre National De Recherches<br>Metallurgiques<br>Brussels, Belgium |
| [32] | Priority | July 3, 1968 |
| [33] | | Belgium |
| [31] | | 717,560 |

[54] DEVICE FOR FEEDING A BAKING APPARATUS FOR GREEN PELLETS
2 Claims, 1 Drawing Fig.

[52] U.S. Cl. .................................................. 222/55, 222/415
[51] Int. Cl. ..................................................... G01f 1/00
[50] Field of Search ............................................. 222/55, 415; 198/39, 96, 101

[56] References Cited
UNITED STATES PATENTS
| 3,182,859 | 5/1965 | Harris et al. ................. | 222/146 X |
| 3,297,204 | 1/1967 | Adamson ..................... | 222/55 |

*Primary Examiner*—Robert B. Reeves
*Assistant Examiner*—Francis J. Bartuska
*Attorney*—Holman & Stern ABSTRACT: The invention relates to the feeding of baking apparatus with green pellets, for instance of iron ore, supplied by pelletizing apparatus the output of which may fluctuate. The green pellets coming from the pelletizing apparatus, optionally after screening, is fed to a movable belt conveyor discharging to a fixed belt conveyor which in turn discharges to the baking apparatus. Measuring apparatus measures the mass flow rates of the green pellets discharging from both conveyors. The movable conveyor is moved parallel to the conveying direction of the fixed conveyor at a velocity proportional to the difference between the mass flow rates so that the depth of the layer of green pellets on the fixed conveyor is approximately constant.

Patented Dec. 28, 1971
3,630,414
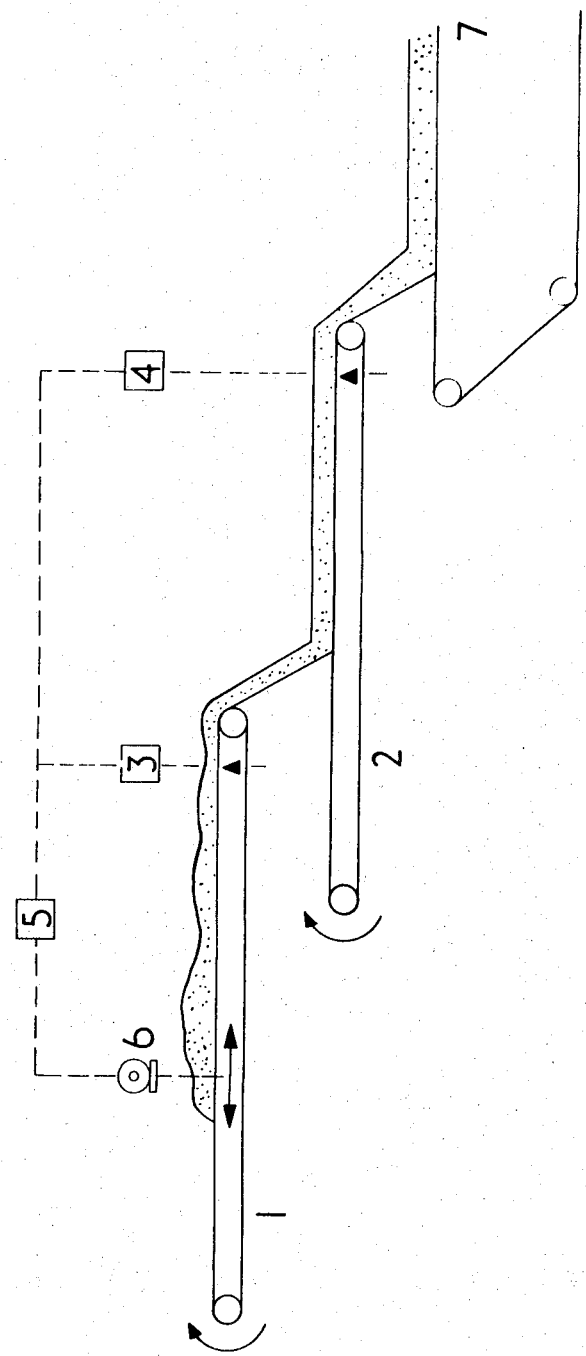
INVENTOR
Paul Victor Parmentier
BY
Holman, Glascock, Downing & Seebold
ATTORNEYS

DEVICE FOR FEEDING A BAKING APPARATUS FOR GREEN PELLETS

The invention relates to a process and device for feeding apparatus for baking green pellets, such as pellets of iron ores.

Whatever may be the type of device used for shaping the pellets, disc or drum, one observes a cyclic variation of the mean size of the pellets, probably due to a lack of balance between the rate of information of the nodules which start the pellets and the rate of increase in size of the pellets. When the small nodules during formation succeed in catching all the fresh material fed, their growth accelerates rapidly until the moment when the pellets have reached a sufficient size to escape in a body from the apparatus. This mass overflow permits anew the fresh material to form starting nodules and the cycle recommences.

The weight and the dimensions of the product delivered by the pelletizing apparatus therefore vary periodically, which runs contrary to the conditions required for a satisfactory feed of the baking apparatus.

To cope with the difficulty of an irregular feed of a pellet baking apparatus, the following different processes have already been advocated, either on their own or in a combination:

1. use of a screening system intended to eliminate the pellets which are too small such as for example those having dimensions less than 5 to 8 mm, this system preferably also being intended to eliminate the pellets which are too large, that is to say those whose dimensions are higher than 20 or 25 mm.
2. in the case where the pelletizing apparatuses are discs or plates, the regulation of the growth cycle of the green pellets is effected by a control method based on the instantaneous power demand of the pelletizing apparatus.
3. use of a moving intermediate belt situated between the pelletizing and baking apparatuses. This belt preferably moves at a speed proportional to the flow aimed at in the baking apparatus and the conveyance of the green pellets is effected in a layer of low height so as to avoid too strong a degradation of the said green pellets.

All these processes, on their own or in combination, according to needs, are known and of current application. The results obtained so far have proved satisfactory to a certain extent and have contributed to an improvement in the feed conditions of green pellets for the baking apparatus.

However, it would be advisable to note that, by using a screening system such as specified above, one increases the regularity of the granulometry of the pellets to the detriment of the constancy of mass flow. It is the same when one uses a regulation system of the growth cycle of the said pellets also mentioned above, but the resulting variation in mass is less, of the order of 5 percent.

The use of a moving intermediate belt situated between the pelletizing and baking apparatuses, such as is generally practised in present installations, permits only certain small instantaneous irregularities of feed to be remedied.

According to the invention, there is provided a process for feeding apparatus for baking green pellets by means of a movable conveyor means for receiving green pellets and a fixed conveyor means for receiving green pellets discharged by the movable conveyor means and for discharging the green pellets to the baking apparatus, the process comprising measuring the mass flow rate of green pellets discharging from the movable conveyor means, measuring the mass flow rate of green pellets discharging from the fixed conveyor means, and moving the movable conveyor means in a direction parallel to the conveying direction of the fixed conveyor means at a velocity functionally related to the difference between the mass flow rates, and preferably proportional to this difference, so that the mass flow rate of green pellets discharging from the fixed conveyor means is maintained approximately constant.

The invention further provides a device for feeding apparatus for baking green pellets, the device comprising a movable conveyor means for receiving green pellets, a fixed conveyor means for receiving green pellets discharged by the movable conveyor means and for discharging the green pellets to the baking apparatus, first measuring means for measuring the mass flow rate of green pellets discharging from the movable conveyor means, second measuring means for measuring the mass flow rate of green pellets discharging from the fixed conveyor means, and drive means for moving the movable conveyor means in a direction parallel to the conveying direction of the fixed conveyor means.

With a view to decreasing the amplitude of variations in feed flow of green pellets and thus to facilitating the regulation of the mass flow rate of green pellets discharging from the fixed conveyor means, it is advantageous to use several pelletizing apparatuses to supply the movable conveyor means.

The invention will be further described with reference to the accompanying drawing, the sole FIGURE of which schematically illustrates one embodiment of the invention.

The apparatus shown comprises a movable belt conveyor 1, a storage belt conveyor 2, apparatus 3 for determining the mass flow rate of the pellets discharged from the belt conveyor 1, apparatus 4 for determining the mass flow rate of the pellets discharged from the storage belt 2 to baking apparatus 7, a calculation module 5 intended to receive the information from the weighing apparatuses 3 and 4, to calculate the difference thereof and to transmit a signal characteristic of this difference to driving means 6 for the translational movement of the conveyor 1.

The intermediate storage belt 2 has a sufficient length so that it can discharge a regular mass flow for several minutes, for example, in the event of a disturbance of the flow of green pellets onto the conveyor 1. When a difference between the mass flow rates measured by the apparatuses 3 and 4 is detected and measured by the module 5, the module transmits a control signal to the drive means 6 which moves the conveyor 1 so that its point of discharge onto the conveyor 2 moves in such a direction and at such a speed that the mass of green pellets per unit length of the conveyor 2 is approximately constant.

In this way the layer of green pellets on the storage belt 2 is permanently maintained at an approximately constant height and degradation of the green pellets by an increase in height of the layer is avoided.

The apparatus 3 measures the mass flow rate at a fixed distance from the discharge end of the conveyor 1 so that any variation in mass flow rate can be detected before discharge and the drive means controlled so that the variation in mass flow is compensated at the moment it is discharged from the conveyor 1.

This apparatus can obviously be used either on its own or in combination with other devices also intended to ensure a feed which is as regular as possible of the baking apparatus.

For example, an installation of this kind could comprise four pelletizing discs equipped with means to ensure the regulation of the growth cycle of the green pellets by a method of control based on the instantaneous power demand of the said pelletizing plates. At the outlet of these discs, the pellets obtained can be treated in a screening installation eliminating pellets which are too small or too large. Finally, the pellets coming from this screening installation are loaded or conducted by a fixed conveyor to the movable belt conveyor 1, then from there to the storage belt 2.

I claim:

1. In a device for feeding apparatus for baking green pellets, the improvement wherein the device comprises a movable conveyor means for receiving green pellets, a fixed conveyor means for receiving green pellets discharged by the movable conveyor means and for discharging the green pellets to the baking apparatus, first measuring means for measuring the mass flow of green pellets discharging from the movable conveyor means, second measuring means for measuring the mass flow of green pellets discharging from the fixed conveyor means, and drive means for moving the movable conveyor means in a direction parallel to the conveying direction of the fixed conveyor means, said first and second measuring means being adapted to emit signals characteristic of the respective mass flow rates, the device further comprising a module adapted to receive said signals and to emit a signal characteristic of the difference between the mass flow rates, the drive means being adapted to receive the signal emitted by the module, the signal controlling the drive means in such a manner as to move the movable conveyor means at a velocity related to the difference between the mass flow rates so that the mass flow rate of green pellets discharging from the fixed conveyor means is maintained approximately constant.

2. A device as claimed in claim 1, in which the velocity of movement of the movable conveyor is directly proportional to the said difference.

* * * * *